UNITED STATES PATENT OFFICE.

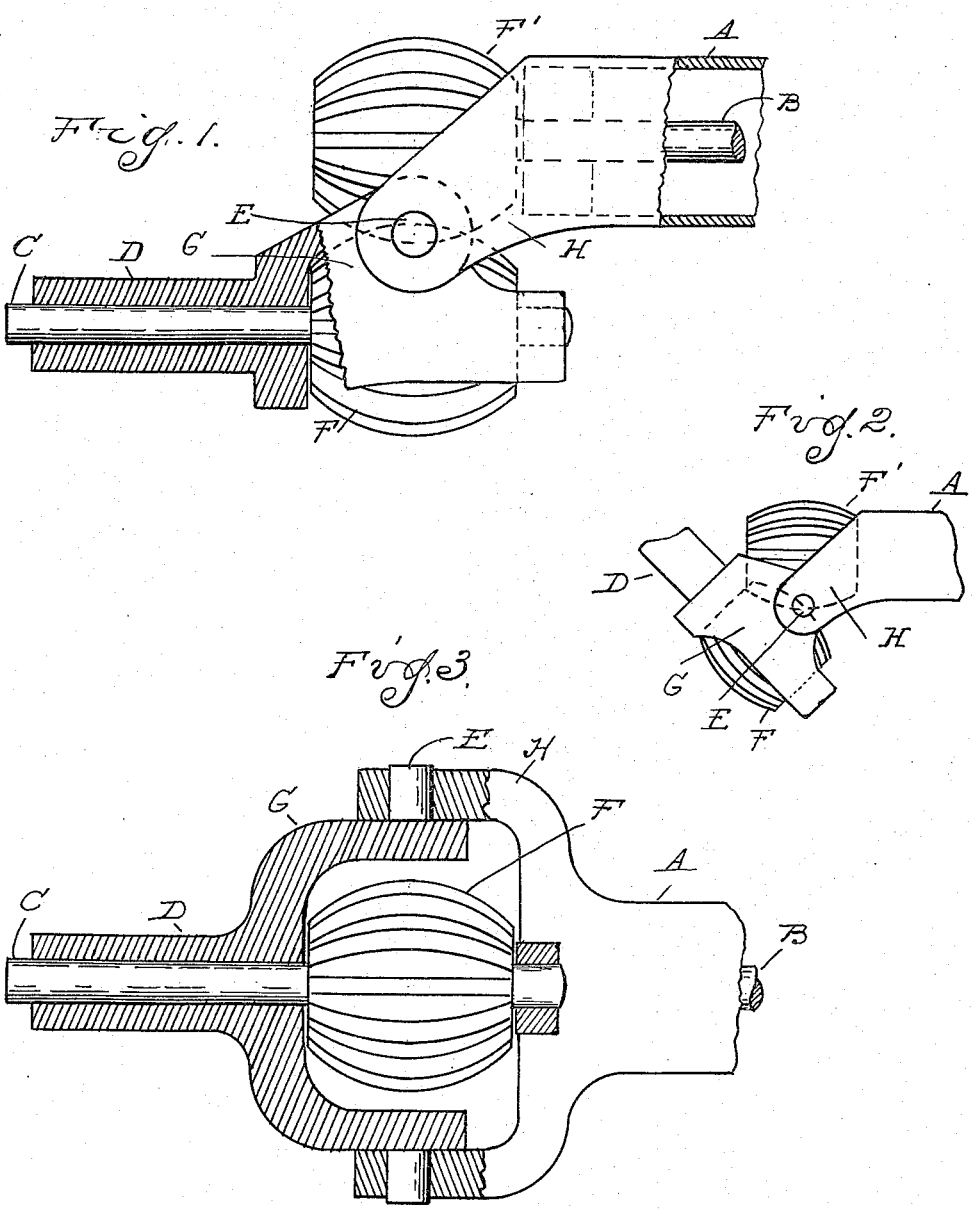

FREDERICK J. HAYNES AND BENJAMIN F. HAYNES, OF ALBA, MICHIGAN.

GEARING.

1,174,716.  Specification of Letters Patent.  Patented Mar. 7, 1916.

Application filed February 23, 1915. Serial No. 9,897.

*To all whom it may concern:*

Be it known that we, FREDERICK J. HAYNES and BENJAMIN F. HAYNES, citizens of the United States of America, residing at Alba, in the county of Antrim and State of Michigan, have invented certain new and useful Improvements in Gearing, of which the following is a specification, reference being had therein to the accompanying drawings.

The invention relates to gearing designed for use in communicating rotary movement between two members so as to permit of angular adjustment of said members in relation to each other.

More particularly the invention is designed for use in driving the front or steering wheels of a vehicle without interference with their freedom for adjustment in steering.

In the drawings: Figure 1 is a plan view of the gearing; Fig. 2 is a similar view showing a different adjustment of parts; and Fig. 3 is a side elevation.

A is an axle housing containing a driven axle B.

C is a stub axle upon which one of the steering wheels is mounted, journaled in a bearing D which is pivotally mounted at E upon the axle housing A.

To communicate the rotary drive from the axle B to the stub axle C without interfering with angular adjustment of the latter about the pivot E, we have provided a pair of intermeshing vertical gears. These gears are so placed in relation to the pivot, and are of such a curvature that in every position of adjustment of the stub axle C the gears will remain in mesh. Furthermore, the same ratio of diameters is maintained in each position of adjustment, so as not to effect in any way the speed of the drive.

In detail, F and F' are the intermeshing substantially spherical gears respectively mounted upon the stub axle C and the drive axle B.

G is a bifurcated bracket upon the bearing D, which embraces the gears and forms a bearing for engagement with a pivot E, while a similar bifurcated bracket H on the axle housing A is provided to coöperate with the bracket G. The pivot E is also divided so that it may be arranged without interference with the gears. Thus in operation the rotation of the shaft B may be continuously communicated to the stub axle C during the rocking of the latter incident to the steering of the vehicle.

What we claim as our invention is:—

1. The combination with a drive shaft and a driven shaft, of bearings for said shafts pivotally engaging each other to permit of relative angular adjustment, and intermeshing gears upon said shafts fashioned to maintain their engagement and a constant ratio of drive in all positions of said angular adjustment, said gears having a rolling contact with each other from one position of adjustment to another.

2. The combination with a drive shaft and a driven shaft, of bearings for said shafts pivotally connected to each other to permit of relative angular adjustment, and substantially spherical gears upon the respective shafts intermeshing with each other in alinement with the axis of the pivot and in all positions of relative angular adjustment.

3. The combination with an axle, of a stub axle mounted to be angularly adjustable in relation to said axle, intermeshing gears respectively secured to said axle and stub axle, fashioned to maintain the same ratio of drive in all positions of angular adjustment, and a single pivotal connection between said axle and stub axle positioned substantially in the plane tangential to said gears.

4. The combination with an axle and a stub axle, of bifurcated brackets connected to said axle and stub axle and pivotally engaging each other, a drive shaft for said axle, a driven spindle for said stub axle, and similar substantially spherical gears mounted upon said drive shaft and spindle, intermeshing with each other and maintaining the same ratio of drive in all positions of relative angular adjustment, corresponding portions of the gears being adapted to engage each other in the different positions of relative angular adjustment.

In testimony whereof we affix our signatures in presence of two witnesses.

FREDERICK J. HAYNES.
BENJAMIN F. HAYNES.

Witnesses:
J. ANDERSON,
F. M. MYERS.

Copies of this patent may be obtained for five cents each, by addressing the "Commissioner of Patents, Washington, D. C."